Feb. 2, 1965 R. A. ZOLLER 3,167,825
STRIP STRUCTURES
Filed Nov. 13, 1961 3 Sheets-Sheet 1
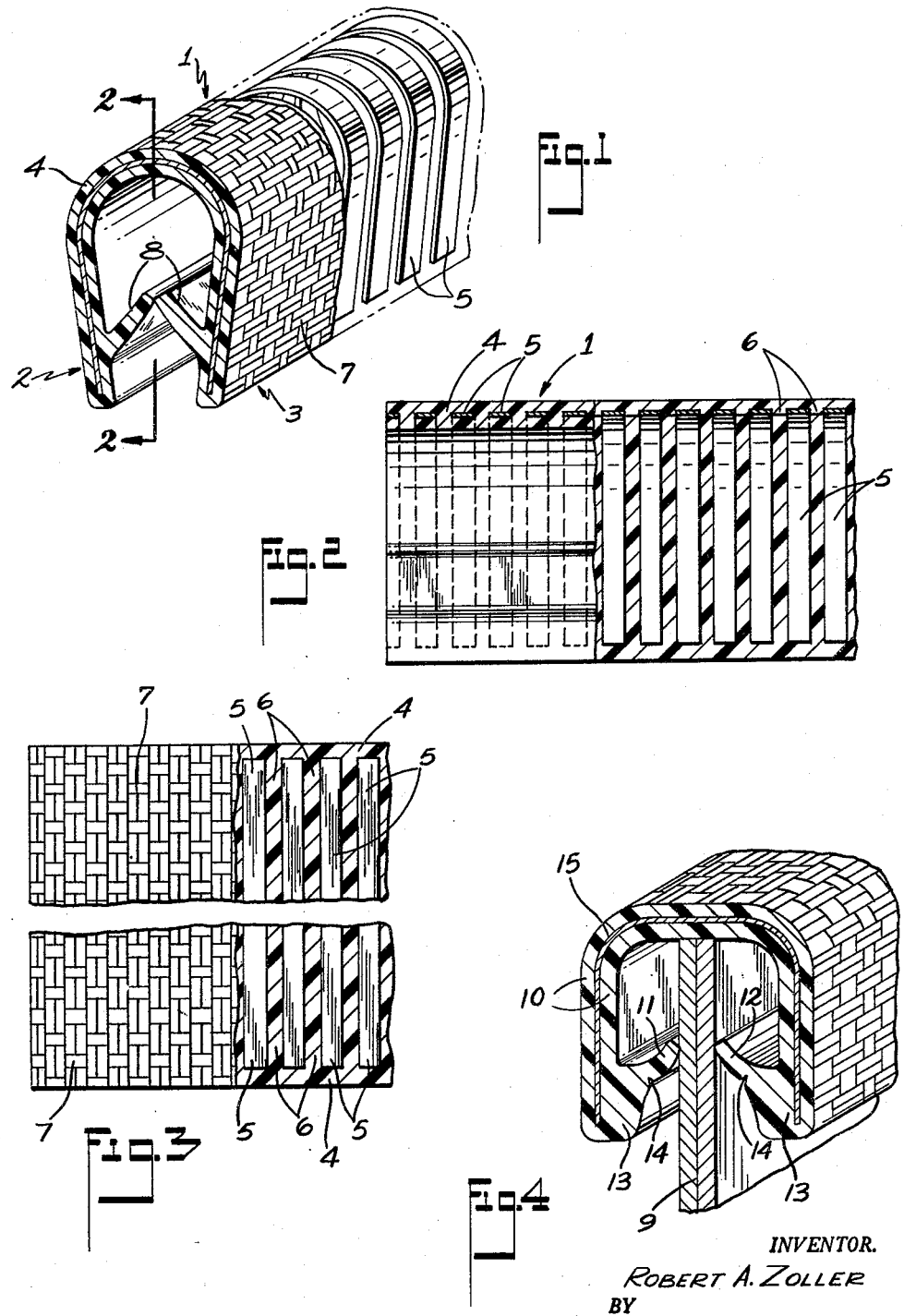
INVENTOR.
ROBERT A. ZOLLER
BY
Meyer, Baldwin, Doran & Egan
ATTORNEYS

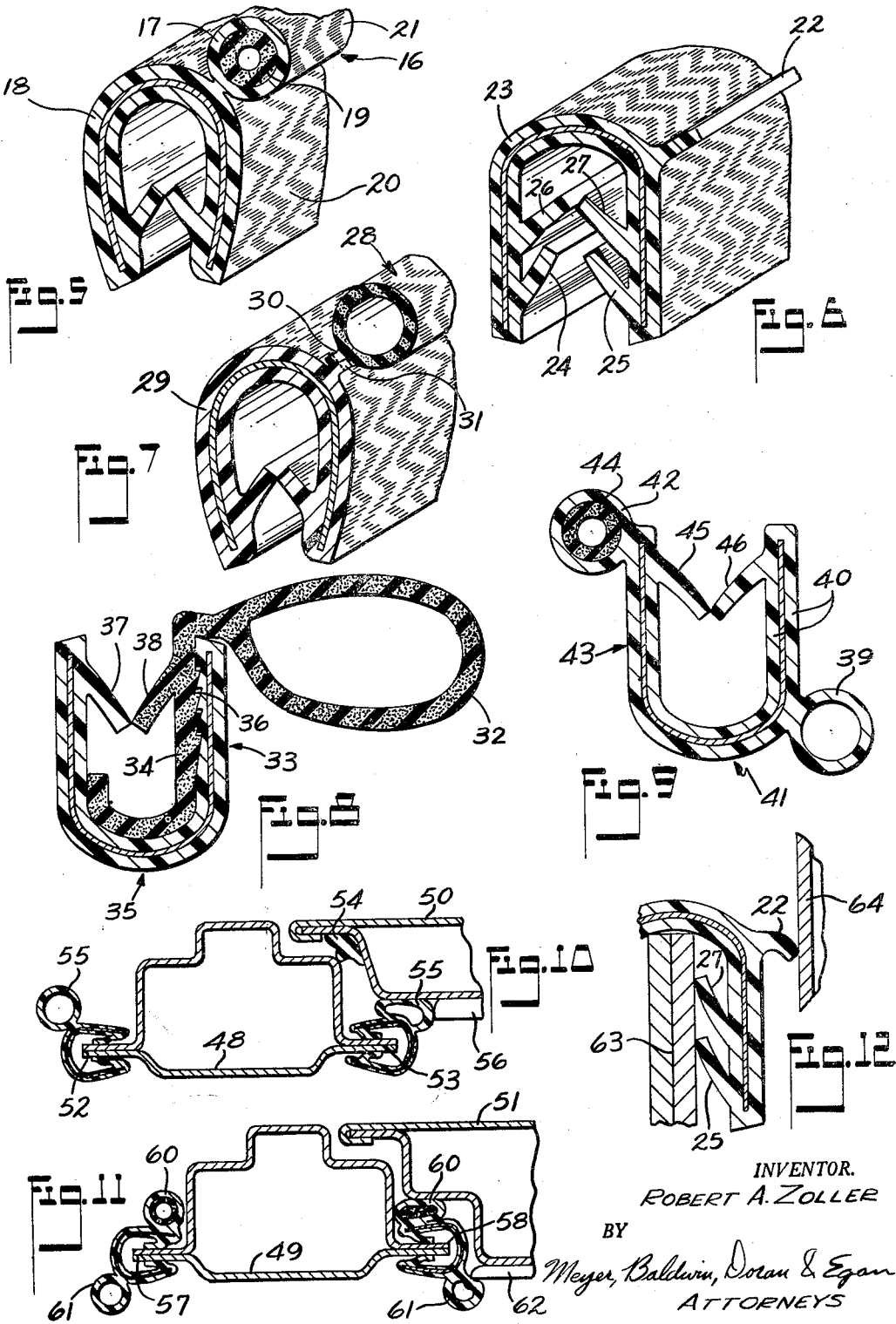

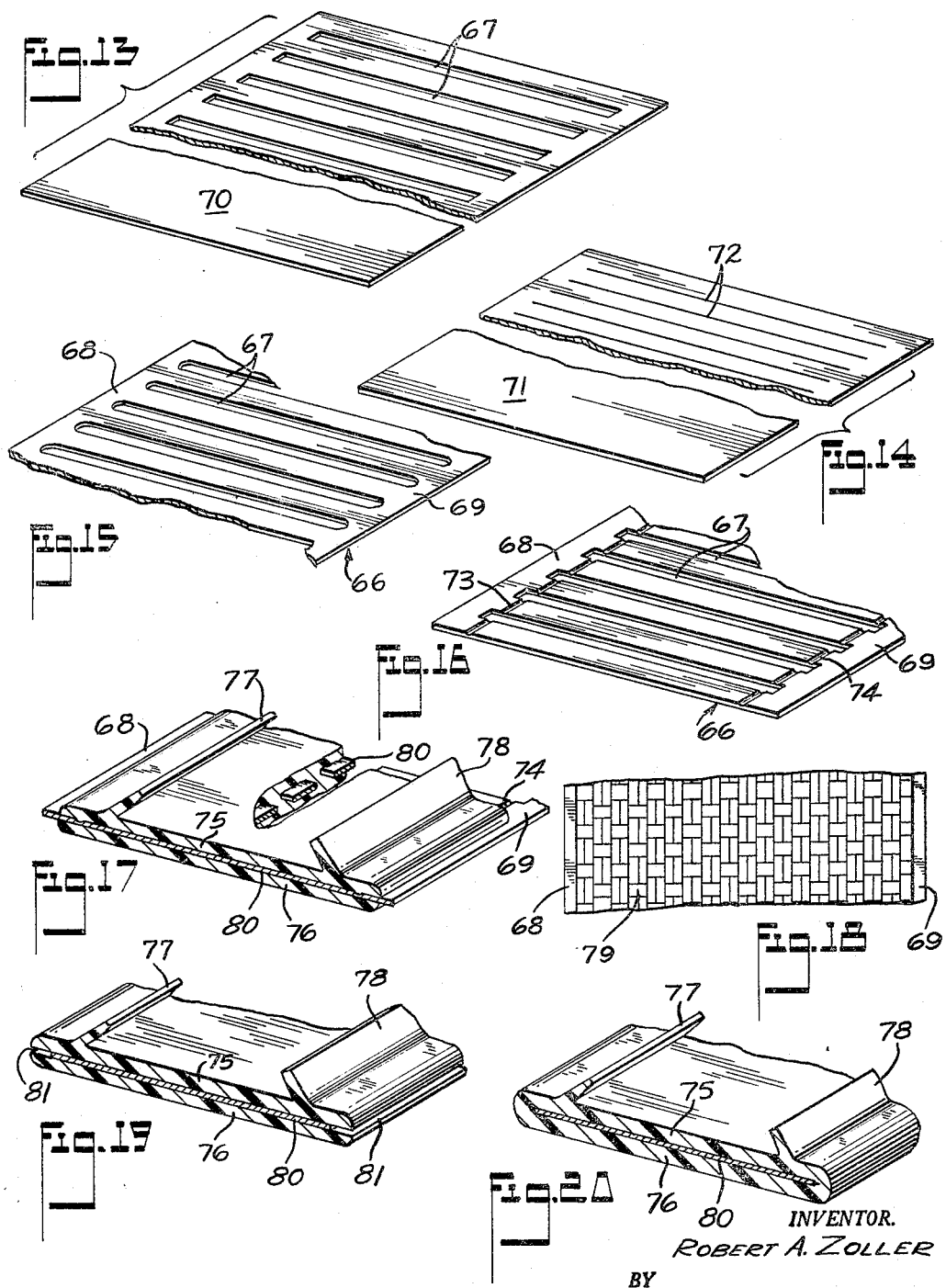

United States Patent Office 3,167,825
Patented Feb. 2, 1965

3,167,825
STRIP STRUCTURES
Robert A. Zoller, Bay Village, Ohio, assignor to The Standard Products Company, Cleveland, Ohio, a corporation of Ohio
Filed Nov. 13, 1961, Ser. No. 151,915
9 Claims. (Cl. 20—69)

This invention relates to strip structures and more particularly, to strip structures of generally channel shape in cross section for embracing engagement with and clamping retention on edge flanges or other parts, such as those of automobile bodies, for trimming, sealing or other purposes.

The invention has for one of its primary objects the provision of a strip structure of the aforesaid character which is characterized by its outstanding flexibility both laterally and longitudinally, by the attractive embossing with which its outer surface may be provided, and by the ease with which it may be pressed onto and thereby firmly held or retained on an edge flange or other part, regardless of variations in the thickness thereof or transverse or longitudinal curvatures therein.

A more specific object of the present invention is the provision of a channel-shaped strip structure of the aforesaid character which embodies a covered core consisting of a series of individual, entirely unconnected sheet metal elements of resilient character and of relatively narrow form which are arranged in closely neighboring relation along the strip structure, and which core elements, because of their unconnected nature, enable the strip structure to be freely bent, laterally and longitudinally and otherwise, in various arcs and in various ways to achieve maximum conformity to and adaptability for use with various edge flanges or other parts on which the strip structure is to be mounted in use thereof and without any buckling or other objectionable deformation of the core covering.

A further more specific object of the present invention is the provision of a strip structure of the aforesaid character in which the covering material for the individual core elements is provided within the strip structure with opposed longitudinally extending ribs or lips, of resilient flexible character, which yieldably but firmly engage, for the secure retention of the strip structure on the edge flange or the like on which the strip structure is to be mounted in use thereof, the ribs or lips preferably being convergently related and extending toward the crown portion of the strip structure for ease in the application of the strip structure to said edge flange or the like.

A further more specific object of the present invention is the provision of a channel-shaped strip structure of the aforesaid character which may be provided with one or more sealing sections or parts, so that in addition to serving as a molding or a trim or finishing strip, such strip structure also may serve to seal any cracks or crevices adjacent the edge flange or the like on which the strip structure is mounted in use thereof.

A further object of the present invention is the provision of a strip structure of the aforesaid character in which the outer surface of the core covering is suitably ornamented, such as by embossing, with any desired design, such as one which simulates woven fabric, leather or the like, and in which the embossing or other ornamentation covers the entire outer surface of the strip structure, right up to the free ends of the side walls thereof, and most economically.

Further objects of the present invention and certain of its practical advantages, will be referred to in or will be evident from the following description of several embodiments of the invention, as illustrated in the accompanying drawings, in which:

FIG. 1 is a perspective view of a strip structure constituting one embodiment of the present invention, the core covering being shown in dot-dash lines in the rear portion of the strip structure in order to indicate the individual and unconnected transverse core elements;

FIG. 2 is a longitudinal vertical sectional view on the line 2—2 of FIG. 1, with a portion of the core covering being omitted in the rear portion of the strip structure to show the transversely disposed core elements;

FIG. 3 is a plan view of the strip structure of FIGS. 1 and 2 in flat form prior to its being bent into channel shape, a portion of the core covering being broken away;

FIG. 4 is a perspective view of a slightly modified form of strip structure embodying the present invention, the strip structure being shown as clampingly mounted on an edge flange or other part;

FIGS. 5, 6 and 7 are perspective views of strip structures embodying other forms of the present invention, the strip structures of these views being provided with longitudinally extending sealing sections;

FIGS. 8 and 9 are cross-section views of still other strip structures embodying the present invention, the strip structure of FIG. 8 having a sealing section of rubber which is carried by an anchoring portion arranged within the channel-shaped strip structure, and the strip structure of FIG. 9 having two longitudinally extending sealing sections, one adjacent the crown end of one of the side walls of the strip structure and the other adjacent the free end of the opposite side wall of the strip structure.

FIG. 10 is a cross-sectional view of an automobile body pillar and a portion of an adjacent door, the body pillar being provided on opposite sides thereof with strip structures embodying the present invention;

FIG. 11 is a view similar to FIG. 10 but with the body pillar being provided with other forms of strip structures embodying the present invention;

FIG. 12 is a vertical fragmentary cross-sectional view of the strip structure of FIG. 6, the strip structure being shown in use thereof with the longitudinally extending sealing section thereof being flexed as in use thereof; and FIGS. 13 to 20 are views showing various stages in the manufacture of a strip structure embodying the present invention, with FIG. 13 being a perspective view of a metal core strip, the rear portion of which is transversely slotted;

FIG. 14 is a view similar to FIG. 13 but showing a core strip which is provided with transverse slits, rather than transverse slots;

FIG. 15 is a perspective view of the core strip of FIG. 14 after the strip has been elongated, with the consequent widening of the transverse slits into transverse slots;

FIG. 16 is a perspective view of the transversely slotted core strip of either FIG. 13 or FIG. 15, with the strip being provided with two longitudinally extending laterally spaced weakening grooves which intersect the transverse slots adjacent the ends thereof;

FIG. 17 is a perspective view of the core strip of FIG. 16, with covering material enclosing all but the side edge portions of the core strip, a portion of the strip structure being broken away and in section and the core covering being provided on one face of the strip structure with a pair of longitudinally extending laterally spaced flexible clamping ribs or lips;

FIG. 18 is a view of the other side of the covered core strip of FIG. 17 and showing the embossing with which the outer surface of the core covering on this side is provided;

FIG. 19 is a view corresponding to FIG. 17 but with the side edge portions of the core strip outwardly of the longitudinal weakening groove having been removed; and FIG. 20 is a view corresponding to FIG. 19 but showing in closed condition the core covering side edge openings which are formed by the removal of the side edge portions of the core strip.

Before specifically describing the strip structures here illustrated for the disclosure of certain embodiments of the present invention, it is to be understood that strip structures embodying the invention can take various other forms. It also is to be understood that the terminology or phraseology herein used is for purposes of description and not of limitation, as the scope of the present invention is denoted by the appended claims.

Referring now to FIGS. 1–3, it will be noted that the strip structure there illustrated for the disclosure of one embodiment of the present invention is of channel shape in cross-section, with a crown portion 1 of arched form and a pair of side walls 2 and 3 which are here shown as being inwardly inclined or convergently related. Like other strip structures which embody the present invention, the strip structure of FIGS. 1–3 includes a resilient core and an enclosing covering 4 therefor, with the core consisting of a series of transversely disposed and longitudinally arranged elements 5 which are relatively narrow and free of any connection to one another. As a result of the relatively narrow form and the unconnected nature of the core elements 5, the strip structure has outstanding flexibility, both longitudinally and laterally, so that it can be readily and freely bent, twisted or otherwise manipulated, without buckling or other objectionable distortion of the core covering 4, to enable the strip structure to conform to the contour, regardless of bends or curvatures therein, of the edge flange or other part on which the strip structure is mounted in use thereof. Although the core elements 5 may be of any desired length, they preferably are of such length that they terminate adjacent the free edges of the strip structure side walls, as here shown.

Preferably, the core elements 5 are of relatively thin sheet steel, and as will hereinafter appear, they may be formed from a single metal strip and arranged within the core covering 4 by a particularly novel and economical method which constitutes a part of the present invention. In order to prevent buckling of the core covering 4 when the strip structure is transversely bent or twisted, and in order to give the strip structure desirable strength without sacrifice of flexibility, the core elements 5 are arranged in closely neighboring relation. Preferably and as here shown, the core elements are spaced slightly apart, with portions of the core covering 4 extending through such spaces, as at 6, FIGS. 2 and 3, to bond together the core covering on opposite faces of the core elements. If desired, however, the core elements may be in substantially contiguous side-by-side relationship, in which event the core elements desirably are provided with perforations or the like to enable the core covering on opposite faces of the core elements to be bonded together.

As to the core covering 4, it may be of any suitable material. However, a covering of plasticized polyvinyl chloride is particularly suitable and is preferred, inasmuch as such material is quite weather resistant, of the desired elasticity, and is easily extruded for association with the core elements 5. In order to enhance the attractiveness of the core covering which may be of any desired color, its outer surface is preferably ornamented, as indicated by the reference numeral 7. As will hereinafter appear, the ornamentation may be provided, in a simple and economical manner, by an embossing operation, with the pattern being, for example, one which simulates woven fabric, leather or the like. As will be evident from FIGS. 1 and 2, the outer surface of the core covering may be and preferably is ornamented, and by having the ornamentation extend clear up to the free edges of the side walls of the strip structure, the simulation of fabric, leather or the like is materially enhanced.

For the purpose of enabling the strip structure to be firmly retained on the edge flange or other part onto which it is pressed in use thereof, the strip structure of FIGS. 1– 3 is provided with a pair of flexible ribs or lips extending along the inner surfaces of the strip structure side walls in opposed relation for clamping engagement with said edge flange or other part. As shown in FIG. 1, the clamping ribs or lips 8 are integral with the core covering 4 and here extend from the inner surfaces of the strip structure side walls, in spaced relation to the free longitudinal edges thereof, inwardly and upwardly toward the crown portion 1 of the strip structure. As indicated in FIG. 1, the free longitudinal edges of the clamping ribs or lips 8 are preferably in normally abutting or closely neighboring relationship so that the insertion therebetween of an edge flange or other part in the mounting of the strip structure thereon causes the ribs or lips 8 to flexibly but firmly engage said flange or other part for the secure retention of the strip structure thereof. Although the ribs or lips 8 may have any desired angular disposition with respect to the side walls of the strip structure, the convergent inclination of the ribs or lips in the strip structure of FIGS. 1 to 3 toward the crown portion 1 of the strip structure facilitates the pressing of the strip structure onto an edge flange or other part, as will be readily understood.

In FIG. 4 is illustrated a strip structure embodying a slightly modified form of the present invention, and for purposes of indicating an edge flange on which may be mounted in use thereof strip structures embodying the present invention, the strip structure of FIG. 4 is shown as being clampingly mounted on a two-part edge flange 9, such as an edge flange of an automobile body pillar.

As will be noted, the crown portion of the strip structure of FIG. 4 is of somewhat flatter form and the side walls of such strip structure are generally parallel, rather than convergently inclined as in the strip structure of FIGS. 1 to 3. Further, the core covering 10 below or outwardly of the elongated clamping ribs or lips 11 and 12 is of increased thickness, as at 13, which stiffens the strip structure somewhat adjacent the free longitudinal edges of its side walls but without sacrifice of the flexibility which characterizes strip structures embodying the present invention.

If desired, the clamping ribs or lips of any of the here illustrated strip structures may be longitudinally slit for increased flexibility thereof, and for purposes of illustration, the clamping ribs or lips 11 and 12 of the strip structure of FIG. 4 are longitudinally slit, as at 14, in the lower or outer surfaces thereof. As in the strip structure of FIGS. 1 to 3, the strip structure of FIG. 4 has, of course, a core which consists of transversely disposed individual elements 15 of resilient character and entirely free of connection to one another.

In FIGS. 5, 6 and 7 are illustrated strip structures which also embody the present invention and which primarily differ from the strip structure of FIGS. 1 to 3 in that they are provided with resilient auxiliary sections, for sealing or gap-closing purposes, extending along the embossed outer surfaces of the core coverings at one side of the crown portions of the strip structures.

In the strip structure of FIG. 5, the auxiliary section 16 is of tubular form and consists of inner and outer tubular portions. As here shown, the outer tubular portion 17 is of the same material as the core covering 18, such as plasticized polyvinyl chloride, and is "heat sealed" or otherwise suitably bonded to the core covering. The inner tubular portion 19 is here shown as being of sponge rubber, and such inner portion not only increases the resiliency or recovery characteristics of the auxiliary section but it also prevents, as will be understood, any buckling of the polyvinyl outer portion 17 if the strip structure is bent in use thereof. Like the embossed outer surface 20 of the core covering 18, the outer surface 21 of the auxiliary section 16 is preferably embossed or otherwise suitably ornamented, as shown.

In the strip structure of FIG. 6, the auxiliary sealing or gap-closing section is an outwardly extending flexible rib or lip 22, which is here shown as being of the same material as the core covering 23, such as plasticized polyvinyl chloride, and "heat sealed" or otherwise suitably bonded to said core covering. As will hereinafter appear (see FIG. 12), in use of the strip structure of FIG. 6, the auxiliary rib or lip 22 is transversely flexed for sealing or gap-closing purposes.

Although the strip structures heretofore described and those to be hereinafter described are each provided on the inner surfaces of the strip structure side walls with a single pair of opposed ribs or lips for clamping engagement with an edge flange or the like in the securement of the strip structure therein, two pairs of such clamping ribs or lips may be provided, if desired, as in the strip structure of FIG. 6. As there shown, one pair of said clamping ribs or lips, marked 24 and 25, are in generally the location of the clamping ribs or lips of previously described strip structures, and the second pair of such clamping ribs or lips, marked 26 and 27, is arranged between the first pair and the crown portion of the strip structure. The provision of two pairs of clamping ribs or lips is added assurance, of course, of the retention of the strip structure on the edge flange or the like on which it is placed in use thereof, although a single pair of such ribs or lips is generally quite adequate for the firm and secure retention of the strip structure.

In the strip structure of FIG. 7, the auxiliary sealing or gap-closing section is a single hollow tube 28, of elastic rubber or a rubber-like material, and which is stitched or otherwise suitably secured to the core covering 29 which may be, as heretofore, of polyvinyl chloride. For securement purposes, the tube 28 is here integrally provided with a relatively narrow flange 30 co-extensive in length therewith and which is stitched or otherwsie suitably secured in overlapping relation to a corresponding flange 31 with which the core covering 29 is provided. Like the embossed outer surface of the core covering 29, the outer surface of the sealing or gap-closing rubber tube 28 is preferably embossed, and for purposes of contrast, if desired, the embossing on the tube 28 may be one which simulates leather and the embossing on the core covering may be one which simulates woven fabric. As the rubber tube 28, like the core covering 29, may be of any desired color, a particularly attractive effect thereby can be achieved.

As heretofore mentioned, in the strip structures of FIGS. 5, 6 and 7, the auxiliary sealing or gap-closing sections thereof are located along one side of the crown portions of the strip structures. In FIG. 8, however, a strip structure embodying the present invention is illustrated which is provided with a sealing or gap-closing section located adjacent the free longitudinal edge portion of one of the side walls of the strip structure.

In the strip structure of FIG. 8, the auxiliary section is a hollow elastic tube 32, of rubber or a rubber-like material, and which extends to one side of the strip structure adjacent the free longitudinal edge portion of its side wall 33. For the support of said sealing or gap-closing tube 32, it is here shown as being provided with an anchoring portion 34, integral and co-extensive in length therewith, and lying within the strip structure along the inner surfaces of its side wall 33 and its crown portion 35. If desired, said anchoring portion 34 may be and here is suitably interlocked, as at 36, with the adjacent portion of the core covering, although the interlocking of such portions is not, of course, essential. Like the previously described strip structures, the strip structure of FIG. 8 has a pair of opposed ribs or lips 37 and 38 for clamping engagement with an edge flange or the like in the use of the strip structure, but, as will be noted, only the rib or lip 37 is a part of the core covering. The other rib or lip 38 is a part of the anchoring portion 34 of the auxiliary rubber section, but the two ribs or lips 37 and 38 cooperate like those of the other strip structures to securely maintain the strip structure of FIG. 8 on the edge flange or other support on which it is placed in use thereof.

In the strip structure illustrated in FIG. 9, there are two auxiliary sealing or gap-closing sections, located on opposite sides of the strip structure, with one of such sections, numbered 39, extending along the core covering 40 at one side of the crown portion 41 of the strip structure and the other section, numbered 42, extending along the core covering 40 adjacent the free longitudinal edge portion of the side wall 43 of the strip structure. As here shown, both of the auxiliary sections 39 and 24 are of tubular form and of the same material as the core covering 40, such as polyvinyl chloride, and are "heat sealed" or otherwise suitably bonded to the core covering. Either or both sections, if desired, may include a suitable inside material, such as the sponge rubber tube 44 in section 42. As in the other strip structures, the strip structure of FIG. 9 is provided with a pair of opposed flexible ribs or lips 45 and 46 for clamping engagement with an edge flange or the like.

Although the cores of the strip structures of FIGS. 5 to 9 have not been specifically described, it is to be understood that each consists, like the core of the strip structure of FIGS. 1 to 3, of a longitudinal series of transversely disposed resilient elements in closely neighboring relation and entirely free of connection to one another.

As heretofore mentioned, strip structures embodying the present invention are particularly suitable for use on edge flanges or the like as moldings or trim or finishing strips, or, if provided with sealing sections, as strip structures for both trimming and sealing purposes.

For purposes of illustration, there are illustrated in FIGS. 10 and 11 automobile center body pillars 48 and 49 and portions of automobile doors 50 and 51, respectively, cooperating therewith. As will be noted, on the edge flanges 52 and 53 at the sides of the center body pillar 48 of FIG. 10 are mounted strip structures of the general character illustrated in FIGS. 5, 7 and 8, or in other words, strip structures with auxiliary sealing or gap-closing sections located along one side of the crown portions of the strip structures. Although the primary seal for the door 50 is provided by the conventional sealing member 54 carried thereby, the auxiliary section 55 of the strip structure mounted on the edge flange 53 effectively closes the gap which otherwise would result between the door and the body pillar adjacent the trim panel 56 on the inner face of the door. A similar function would be served, of course, by the auxiliary section 55 which is mounted on the edge flange 52 of the body pillar 48.

In FIG. 11, strip structures of the general character illustrated in FIG. 9 are mounted on the edge flanges 57 and 58 at the sides of the center body pillar 49, or in other words, strip structures which are provided with two auxiliary sealing or gap-closing sections 60 and 61. Thus, in FIG. 11, no door-carried seals are necessary for either the sealing of the door or the closing of the gap adjacent the door trim panel 62.

In FIG. 12 is fragmentarily shown the strip structure of FIG. 6 as mounted on an edge flange 63, the clamping ribs or lips 25, 27 being in their flexed condition for clamping retention on said flange, and the auxiliary sealing or gap-closing rib or lip 22 being in transversely flexed condition by its engagement with the part 64 for sealing or gap-closing purposes.

As will be readily understood, the manufacture on a commercial scale of a strip structure in which a longitudinal series of transversely disposed and wholly unconnected resilient elements are completely enclosed within a covering material presents many difficult problems. One method which most satisfactorily solves said problems is illustrated in FIGS. 13 to 20, and such method is embraced by and forms a part of the present invention.

Essentially, the method consists of providing a sheet metal strip, of the desired width and thickness and of the desired resiliency, with a longitudinal series of transverse slots, if the core elements of the strip structure are to be spaced apart, or with a longitudinal series of transverse slits, if the core elements of the strip structure are to be in substantially side-by-side or contiguous relationship. As to the transverse slotting or the transverse slitting of the core strip, it can be readily accomplished, of course, by conventional means, but which preferably will be of the continuously operating type.

Inasmuch as strip structures in which the core elements thereof are spaced slightly apart (as best shown in connection with the strip structure of FIGS. 1 to 3) have increased flexibility and thus are preferred, the method of forming a strip structure with such spaced core elements first will be described.

In FIG. 15 is illustrated a transversely slotted sheet metal core strip 66 of the desired width and thickness and of the desired resiliency, with the slots 67 being relatively closely spaced and having their ends terminating near to but short of the side edges of the strip, with the consequent provision of non-slotted side edge portions 68 and 69. As will be readily understood, the transversely slotted strip 66 of FIG. 15 may be provided either (a) by removing from the strip, such as the one denoted by the reference numeral 70 in FIG. 13, transverse sections of metal for the formation of the slots 67, or (b) by transversely slitting a strip such as the one denoted by the reference numeral 71 in FIG. 14 and then elongating the slitted strip by manipulation of the non-slitted side edge portions of the strip to convert the transverse slits 72 into transverse slots.

After its provision, the transversely slotted strip, such as the strip 66 of FIG. 15, is then grooved or otherwise weakened, such as by a coining operation or the like, along two longitudinally extending, laterally spaced lines 73 and 74 which intersect the transverse slots 67 adjacent the ends thereof, as in FIG. 16, with the non-slotted side edge portions 68 and 69 of the core strip thus being located outwardly of said weakening grooves.

Thereafter, the transversely slotted and longitudinally grooved core strip 66 is suitably covered or enclosed except for the outer parts of its non-slotted side edge portions 68 and 69, as in FIG. 17, with the covering layers 75 and 76 on opposite faces of the core strip being of any desired thickness, and with one of said layers, namely, the one here numbered 75, having integrally formed therewith the pair of opposed clamping ribs or lips 77 and 78 for the retention of the strip structure in use thereof. Preferably, the core strip covering, including the clamping ribs or lips thereof, is provided by an extrusion operation, and as the covering material passes through the core strip slots 67, the two layers 75 and 76 of the covering are firmly bonded together, as will be quite evident from the broken out portion of FIG. 17. As heretofore mentioned, one particularly suitable core covering material is plasticized polyvinyl chloride, a material which is easily extruded and which possesses many other desirable characteristics.

The covering material is extruded over the core strip in a heated condition, and while such material is still warm, the outer surface of the covering layer 76 is suitably ornamented, such as by an embossing operation. As will be evident from FIG. 18, the entire outer surface 79 of the covering layer 76 is preferably embossed, the embossing pattern being of any desired character, and as the non-slotted core strip portions 68 and 69 project outwardly beyond the side edges of the covering layer, as shown in FIGS. 17 and 18, the embossing can extend right up to the side edges of said covering layer. This is, of course, of considerable importance in the ornamentation of the strip structure, as the appearance of the strip structure would be appreciably lessened if the embossing or other ornamentation of the outer surface of the covering layer 76—which is the outer covering layer of the strip structure when it is bent into its channel shape—terminated short of the outer side edges of said covering layer.

As shown in FIG. 17, the core covering layers 75 and 76 extend outwardly beyond the longitudinal weakening grooves 73 and 74 of the core strip but not to the outer edges of the non-slotted core strip side edge portions 68 and 69. Therefore, parts of said non-slotted side edge portions 68 and 69 are exposed for suitable manipulation, such as flexure in opposite direction, to cause said side edge portions 68 and 69 to be broken off of the core strip along the weakening grooves 73 and 74. Upon the removal of such broken off side edge portions 68 and 69, there is left between the two covering layers 75 and 76 a longitudinal series of transversely disposed, closely spaced and wholly unconnected core elements—elements which are indicated by the reference numeral 80 in FIGS. 17, 19 and 20 and which correspond, of course, to the core elements 5 of the strip structure of FIGS. 1 to 3.

As shown in FIG. 19, the removal of the core strip side edge portions 68 and 69 results, of course, in the provision of gaps or longitudinal openings 81 between the two core covering layers 75 and 76 at the outer edges thereof. The next step in the present method, therefore, is the closing of said gaps or openings 81, as in FIG. 20, by suitably bonding together, such as by a "heat sealing" operation, the outer side edge portions of the two core covering layers. This completely encloses the individual core elements in their wholly unconnected condition, as will be evident from FIG. 20.

The strip of FIG. 20 is then bent, by any suitable means, into channel shape in cross section, and if the strip is to have an auxiliary sealing or gap-closing section, it can be secured to the core covering either before or after the strip is bent into channel shape, all as will be readily understood.

As heretofore mentioned, if it is desired to have a strip structure in which the unconnected core elements are substantially contiguous, rather than in slightly spaced relation as in the strip structure of FIGS. 1 to 3, a core strip is used which is provided with transverse slits, as in the core strip of FIG. 14, rather than a core strip with transverse slots, as in the core strip of FIG. 15. As will be readily understood, the transversely slitted core strip is treated or processed in the same manner as the previously described transversely slotted core and as indicated in FIGS. 16 to 20. In order to bond together the two core covering layers if a transversely slitted core is used, the core portions between the slits, which will form, of course, the core elements, may be suitably apertured or the like for the passage therethrough of the core covering material.

From the foregoing, it will be evident that strip structures embodying the present invention are characterized by their outstanding flexibility which results from the use of transversely disposed elements which are wholly unconnected, of relatively narrow form and longitudinally arranged in either closely spaced or substantially side-by-side relationship, and which strip structures preferably are further characterized by the attractive embossing with which their entire outer surfaces are provided.

To those skilled in the art to which the present invention relates, further features and advantages thereof will be evident.

What is claimed is:

1. A generally channel-shaped strip structure for embracing engagement with and clamping retention on an edge flange or other support therefor, said strip structure comprising a core and a covering therefor, said core comprising a series of individual, entirely disconnected generally channel-shaped elements of resilient sheet metal and of relatively narrow strip-like form, said elements being disposed transversely of said strip structure in closely spaced relation therealong, and opposed projections carried by said core covering for clamping engagement with the edge flange or other support on which the strip structure is to be mounted in use thereof.

2. A generally channel-shaped strip structure for embracing engagement with and clamping retention on an edge flange or other support therefor, said strip structure comprising a core and a covering therefor, said core being completely enclosed by said covering and comprising a series of individual, entirely disconnected generally channel-shaped elements of resilient sheet metal and of relatively narrow strip-like form, said elements being disposed transversely of said strip structure in closely spaced relation therealong, and opposed projections carried by said core covering for clamping engagement with the edge flange or other support on which the strip structure is to be mounted in use thereof.

3. A generally channel-shaped strip structure for embracing engagement with and clamping retention on an edge flange or other support therefor, said strip structure comprising a core and a covering therefor, the outer surface of at least the major portion of said covering being embossed for appearance purposes, said core being completely enclosed by said covering and comprising a series of individual, entirely disconnected generally channel-shaped elements of resilient sheet metal and of relatively narrow strip-like form, said elements being disposed transversely of said strip structure in closely spaced relation therealong, and opposed projections carried by said core covering for clamping engagement with the edge flange or other support on which the strip structure is to be mounted in use thereof.

4. A generally channel-shaped strip structure for embracing engagement with and clamping retention on an edge flange or other support therefor, said strip structure comprising a core and a covering therefor, said core comprising a series of individual, entirely disconnected generally channel-shaped elements of resilient sheet metal and of relatively narrow strip-like form, said elements being disposed transversely of said strip structure in closely spaced relation therealong, and two sets of opposed projections of flexible character carried by said core covering on the inner surfaces of the side walls of the strip structure and extending along the strip structure for clamping engagement with the edge flange or other support on which the strip structure is to be mounted in use thereof.

5. A generally channel-shaped strip structure for embracing engagement with and clamping retention on an edge flange or other support therefor, said strip structure comprising a core and a covering therefor, said core comprising a series of individual, entirely disconnected generally channel-shaped elements of resilient sheet metal and of relatively narrow striplike form, said elements being disposed transversely of said strip structure in closely spaced relation therealong, and opposed projections of riblike form and of flexible character integral with and carried by said core covering on the inner surfaces of the side walls of the strip structure and extending convergently toward the crown portion of the strip structure for clamping engagement with the edge flange or other support on which the strip structure is to be mounted in use thereof.

6. A generally channel-shaped strip structure for embracing engagement with and clamping retention on an edge flange or other support therefor, said strip structure comprising a core and a covering therefor, said core comprising a series of individual, entirely disconnected generally channel-shaped elements of resilient sheet metal and of relatively narrow strip-like form, said elements being disposed transversely of said strip structure in closely spaced relation therealong, opposed projections carried by said core covering for clamping engagement with the edge flange or other support on which the strip structure is to be mounted in use thereof, and a sealing member of generally tubular form carried by the core covering externally thereof and extending therealong adjacent the crown portion of the strip structure.

7. A generally channel-shaped strip structure for embracing engagement with and clamping retention on an edge flange or other support therefor, said strip structure comprising a core and a covering therefor, said core comprising a series of individual, entirely disconnected generally channel-shaped elements of resilient sheet metal and of relatively narrow strip-like form, said elements being disposed transversely of said strip structure in closely spaced relation therealong, opposed projections carried by said core covering for clamping engagement with the edge flange or other support on which the strip structure is to be mounted in use thereof, and a pair of sealing members carried by the core covering externally thereof and extending therealong, one of said sealing members being located adjacent the crown portion of the strip structure and the other being located adjacent the free end of one of the side walls thereof.

8. A generally channel-shaped strip structure for embracing engagement with and clamping retention on an edge flange or other support therefor, said strip structure comprising a core and a covering therefor, said core comprising a series of individual, entirely disconnected generally channel-shaped elements of resilient sheet metal and of relatively narrow strip-like form, said elements being disposed transversely of said strip structure in closely spaced relation therealong, opposed projections carried by said core covering for clamping engagement with the edge flange or other support on which the strip structure is to be mounted in use thereof, and a separate sealing member having an external sealing portion of generally tubular form adjacent the free end of one of the side walls of the strip structure and also having an anchoring portion extending along and interlocked with the inner surface of such side wall.

9. A generally channel-shaped strip structure for embracing engagement with and clamping retention on an edge flange or other support therefor, said strip structure comprising a core and a covering therefor, said core comprising a series of individual, entirely disconnected generally channel-shaped elements of resilient sheet metal and of relatively narrow strip-like form, said elements being disposed transversely of said strip structure in closely spaced relation therealong, a clamping projection of rib-like form and of flexible character carried by said core covering on the inner surface of one of the side walls of the strip structure, and a separate rubber sealing member having an external sealing portion adjacent the free end of the other side wall of the strip structure and also having an anchoring portion extending along the inner surface of such side wall, said anchoring portion having a clamping projection of rib-like form and of flexible character in opposed relation to said covering projection and cooperable therewith for clamping engagement with the edge flange or other support on which the strip structure is to be mounted in use thereof.

References Cited in the file of this patent

UNITED STATES PATENTS

| | | |
|---|---|---|
| 2,117,455 | Sandler | May 17, 1938 |
| 2,671,041 | Dodge | Mar. 2, 1954 |
| 2,683,907 | Lovasik | July 20, 1954 |
| 2,686,691 | Burrell | Aug. 17, 1954 |
| 2,693,011 | Fernberg | Nov. 2, 1954 |
| 2,746,103 | Bright | May 22, 1956 |
| 2,838,834 | Ganine | June 17, 1958 |
| 2,898,626 | Alderfer et al. | Aug. 11, 1959 |
| 2,954,310 | Truesdell et al. | Sept. 27, 1960 |

FOREIGN PATENTS

| | | |
|---|---|---|
| 753,238 | Great Britain | July 18, 1956 |
| 803,142 | Great Britain | Oct. 22, 1958 |
| 851,521 | Great Britain | Oct. 19, 1960 |